(12) United States Patent
Akiyoshi

(10) Patent No.: US 7,997,397 B2
(45) Date of Patent: Aug. 16, 2011

(54) ONE-WAY CLUTCH

(75) Inventor: Koji Akiyoshi, Iwata (JP)

(73) Assignee: NTN Corporation, Osaka (JP)

( * ) Notice: Subject to any disclaimer, the term of this patent is extended or adjusted under 35 U.S.C. 154(b) by 456 days.

(21) Appl. No.: 12/076,079

(22) Filed: Mar. 13, 2008

(65) Prior Publication Data

US 2008/0236977 A1    Oct. 2, 2008

(30) Foreign Application Priority Data

Mar. 29, 2007    (JP) .................................. 2007-087580

(51) Int. Cl.
*F16D 41/067*    (2006.01)
*F16F 1/06*    (2006.01)
(52) U.S. Cl. .......................................... 192/45; 267/166
(58) Field of Classification Search .................. 267/209, 267/216, 273, 275, 286, 288
See application file for complete search history.

(56) References Cited

U.S. PATENT DOCUMENTS

| | | | | |
|---|---|---|---|---|
| 359,359 | A * | 3/1887 | Morris | 267/288 |
| 1,963,053 | A * | 6/1934 | Powers | 5/256 |
| 4,058,192 | A * | 11/1977 | Haigh | 192/46 |
| 4,549,638 | A | 10/1985 | Johnston | |
| 4,852,708 | A * | 8/1989 | Parkhurst | 192/45 |
| 5,176,232 | A * | 1/1993 | Malecha | 192/45 |
| 6,394,249 | B1 * | 5/2002 | Tazumi et al. | 192/45 |

FOREIGN PATENT DOCUMENTS

JP    60-57020    4/1985

* cited by examiner

*Primary Examiner* — David D Le
*Assistant Examiner* — Jacob S Scott
(74) *Attorney, Agent, or Firm* — Wenderoth, Lind & Ponack, L.L.P.

(57) ABSTRACT

A one-way roller clutch includes an outer ring, and an inner ring mounted inside the outer ring and having an outer cylindrical surface. The outer ring has on its inner periphery a plurality of cam surfaces each defining a wedge-shaped space in cooperation with the cylindrical surface of the inner ring. Rollers are each mounted between one of the cam surfaces and the cylindrical surface. Each roller is biased by a coil spring toward a narrow portion of the corresponding wedge-shaped space. Each coil spring has at its end facing the roller a radially outwardly extending spiral roller abutment portion. The roller abutment portion prevents the end of the coil spring from slipping along and separating from the roller, thus stabilizing the attitude of the coil spring.

17 Claims, 4 Drawing Sheets

ONE-WAY CLUTCH

BACKGROUND OF THE INVENTION

The present invention relates to a one-way roller clutch which is configured to transmit the rotation of its input member in one direction to its output member and stop transmission of the rotation of the input member when the output member begins to rotate at a higher speed than the input member.

This type of one-way clutch is disclosed in JP Patent Publication 60-57020A, which includes an outer ring having on its inner periphery a plurality of cam surfaces circumferentially spaced from each other at equal intervals, and an inner ring having an outer cylindrical surface. A wedge-shaped space is defined between each cam surface and the cylindrical surface. A retainer is mounted between the inner and outer rings and fixed to the outer ring. The retainer is formed with pockets each opposing one of the cam surfaces and each receiving a roller and an elastic member biasing the roller toward the narrow end of the wedge-shaped space. With this arrangement, when the inner and outer rings rotate relative to each other, they are selectively engaged and disengaged.

In order to stably press the cylindrical outer periphery of each roller, the elastic members of this one-way clutch comprise leaf springs each bent in a zigzag manner. Such elastic members tend to be broken due to stress concentration on the U-shaped bent portions thereof, and thus they are not sufficiently durable.

One effective way to avoid this problem would be to use coil springs as the elastic members. But due to limited installation space, it is impossible to use coil springs having a larger diameter than the rollers. Also, because each coil spring is brought into contact with the roller at two points, the attitudes of the coil springs tend to be unstable. In particular, if coil springs having a relatively small diameter are used, as shown in FIG. 7, the end of each coil spring 14 that is pressed against the roller 13 tends to slip along the cylindrical outer surface 13a of the roller 13, so that the spring is bent. In this state, the end of the spring separates from the roller as shown, so that the springs cannot apply a necessary load to the respective rollers 13. In the worst case, one or more of the springs may become trapped between the cylindrical outer surface 13a of the roller 13 and the cam surface 12 of the outer ring 11, and broken.

An object of the present invention is to provide a one-way roller clutch which uses coil springs for the elastic members for pressing the rollers, and of which the coil springs are sufficiently durable and can stably maintain their attitudes.

SUMMARY OF THE INVENTION

According to the present invention, there is provided a one-way roller clutch comprising an outer ring, an inner ring mounted inside the outer ring and having an outer cylindrical surface, the outer ring having on its inner periphery a plurality of cam surfaces each defining a wedge-shaped space in cooperation with the cylindrical surface of the inner ring, rollers each mounted between one of the cam surfaces and the cylindrical surface, and coil springs each biasing one of the rollers toward a narrow portion of the corresponding wedge-shaped space, and having a first end facing the roller and a second end remote from the roller, each of the coil springs having at the first end a radially outwardly extending spiral roller abutment portion.

The roller abutment portion of each of the coil springs may comprise a flat spiral, or may comprise a conical spiral. With the latter arrangement, it is possible to minimize the inclination of the roller abutment portion, thereby applying stable pressing force to the roller. The coil springs may have a circular cross-section, or a rectangular cross-section. The coil springs may be formed of wires having a circular cross-section or a rectangular cross-section.

The one-way clutch may further comprise a retainer mounted between the inner and outer rings and fixed to the outer ring, the retainer having pockets, each receiving one of the rollers, and spring-receiving recesses, each communicating with one of the pockets and receiving the second end of one of the coil springs. With this arrangement, it is possible to further stabilize the attitudes of the coil springs.

By using coil springs for elastic members for pressing each roller toward the narrow portion of the wedge-shaped space, because the coil springs are free of stress concentration, it is possible to improve the durability of the one-way clutch.

By providing the radially outwardly extending spiral roller abutment portion at the end of each coil spring that faces the roller, even if this end of the coil spring is radially displaced, the roller abutment portion is kept in contact with the roller, so that it is possible to prevent the end of the coil spring from slipping along and separating from the cylindrical outer surface of the roller. This stabilizes the attitudes of the coil springs, thereby making it possible to stably press the rollers. That is, it is possible to reliably apply necessary pressing force to the rollers.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
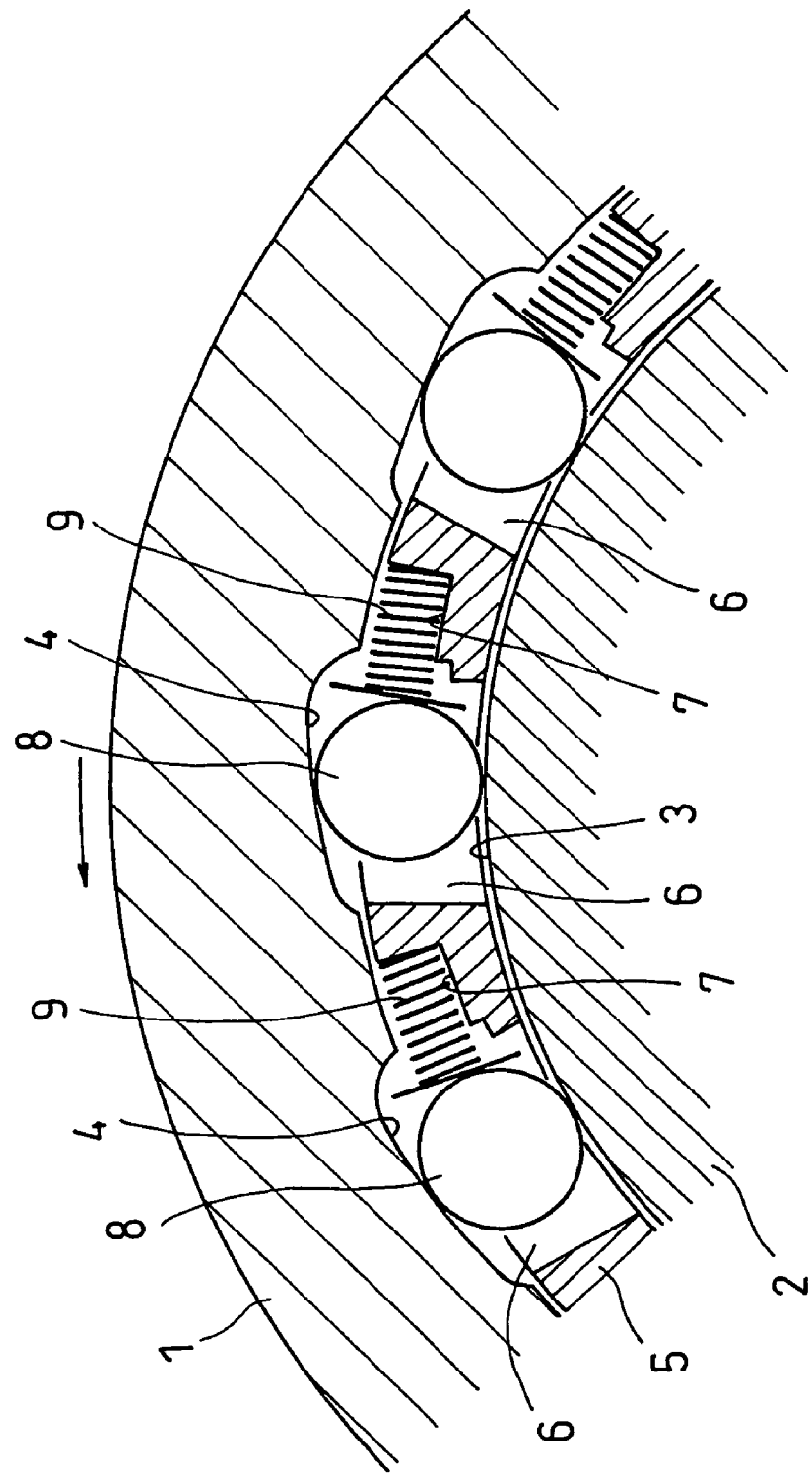
FIG. 1 is a sectional view of a one-way clutch embodying the present invention.

Now referring to the drawings, the embodiment of the present invention is described. As shown in FIG. 1, the one-way clutch of the embodiment includes an outer ring 1 and an inner ring 2 mounted inside the outer ring 1 and having a cylindrical outer surface 3.

On the inner periphery of the outer ring 1, a plurality of cam surfaces 4 are formed that are circumferentially spaced from each other. Between each cam surface 4 and the cylindrical surface 3 of the inner ring 2, a wedge-shaped space is defined of which the radial width gradually decreases from one circumferential end thereof toward the other circumferential end.

Between the outer ring 1 and the inner ring 2, a retainer 5 is mounted which is fixed to the outer ring 1. The retainer 5 is formed with pockets 6 each radially opposing one of the cam surfaces 4 of the outer ring 1. Each pocket 6 has two circumferential end walls that are located at the narrow and wide ends of the corresponding wedge-shaped space, respectively.

In the end wall at the wide end of the wedge-shaped space, a spring-receiving recess 7 is formed.

A roller 8 and a coil spring 9 are mounted in each pocket 6 with the coil spring 9 biasing the roller 8 toward the narrow end of the wedge-shaped space.

Figure 2:
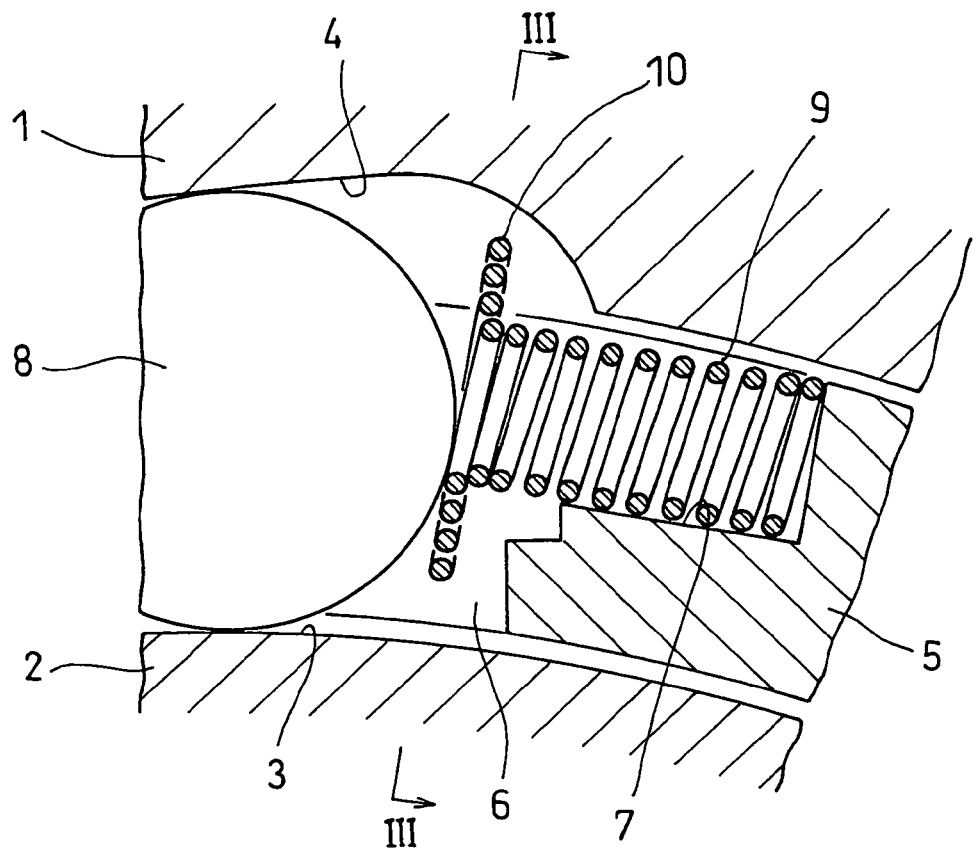
FIG. 2 is an enlarged sectional view of a portion of FIG. 1.
Figure 3:
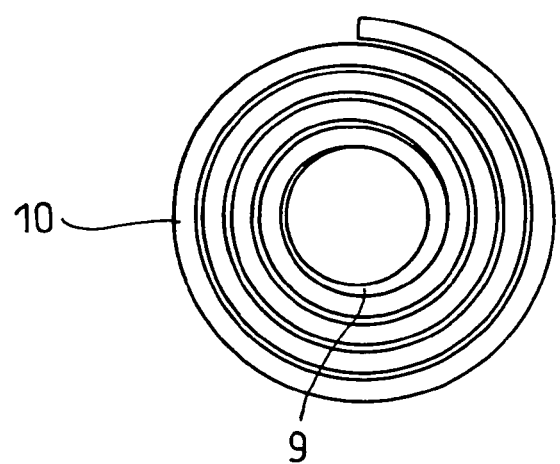
FIG. 3 is a sectional view taken along line III-III of FIG. 2.

As shown in FIGS. 2 and 3, the coil spring 9 has, at its end (first end) opposing the roller 8, a radially outwardly extending roller abutment portion 10. At the opposite end (second end) and extending to the roller abutment portion 10, the coil spring 9 has its main portion. The roller abutment portion 10 comprises a flat spiral. The coil spring 9 has its other end portion (at the second end) received in the spring-receiving recess 7 formed in the retainer 5, and its other (second) end supported by the closed end of the recess 7.

Figure 4A:
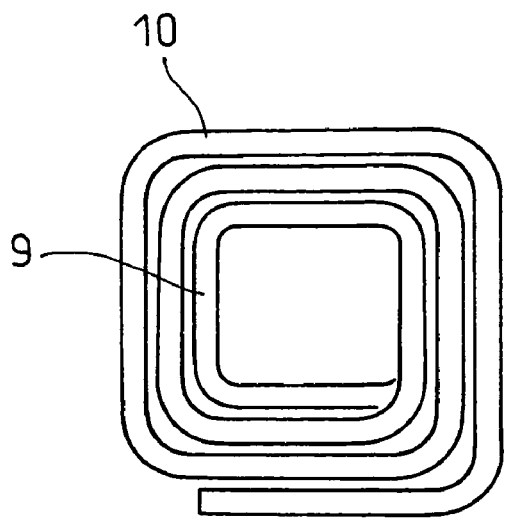
FIGS. 4A and 4B are a side view and a vertical sectional front view of a different coil spring.
Figure 4B:
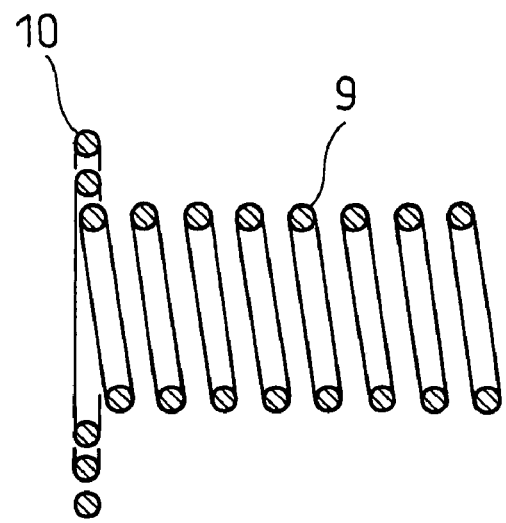

The coil spring 9 may have a circular cross-section, or a rectangular cross-section as shown in FIGS. 4A and 4B. As shown in the figures, the roller abutment portion 10 has an outer diameter larger than a largest outer diameter of the main portion of the coil spring 9.

With this arrangement, when the outer ring 1 rotates in the direction opposite to the direction of the arrow in FIG. 1, the rollers 8 are pushed and wedged into the narrow portions of the respective wedge-shaped spaces defined between the cam surfaces 4 and the cylindrical surface 3. The rotation of the outer ring 1 is thus transmitted to the inner ring 2 through the rollers 8.

While torque is being transmitted from the outer ring 1 to the inner ring 2, if the inner ring 2 begins to rotate at a higher speed than the outer ring 1, the rollers 8 disengage from the narrow portions of the respective wedge-shaped spaces and begin to move toward their wider portions. The rotation of the outer ring 1 is thus not transmitted to the inner ring 2 any more.

When the rollers 8 are moved toward the narrow portions of the respective wedge-shaped spaces, the coil springs 9 extend. When the rollers 8 are moved toward the wide portions of the respective wedge, the coil springs 9 contract. On both occasions, because each coil spring 9 comprises a helically bent wire, and its roller abutment portion 10 comprises a flat spiral, the coil springs are free of stress concentration.

This prevents premature breakage of the coil springs 9 and thus increases the durability of the one-way clutch.

Since each coil spring 9 presses the roller 8 at its radially outwardly extending large-diameter spiral roller abutment portion 10, even if the end of the coil spring 9 facing the roller is radially displaced, the roller abutment portion 10 is reliably kept in contact with the roller 8. That is, the end of the coil spring 9 never separates from the roller 8 by slipping along its cylindrical surface. This makes it possible to keep the coil springs 9 in a stable position, thereby reliably pressing the rollers 8.

Figure 5A:
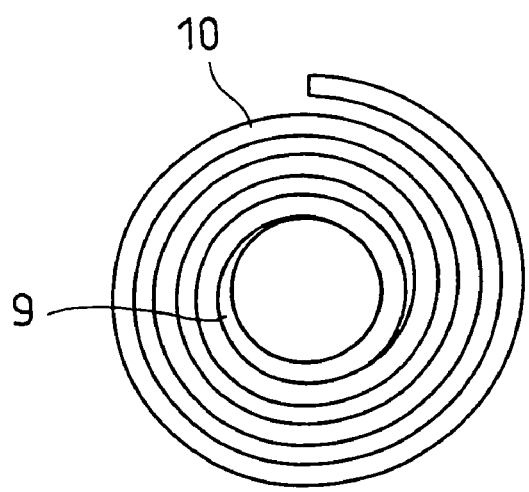
FIGS. 5A and 5B are a side view and a vertical sectional front view of a still different coil spring.
Figure 5B:
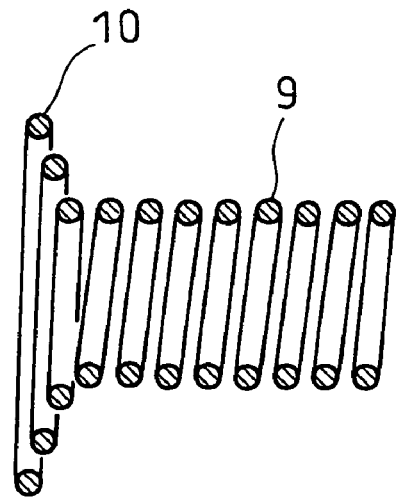

FIGS. 5A and 5B show a different coil spring 9 embodying the invention. This coil spring 9 has a roller abutment portion 10 at its end facing the roller which is in the shape of a conical spiral. Such a conical roller abutment portion 10 is less likely to incline, so that it can press the roller 8 more stably.

Figure 6:
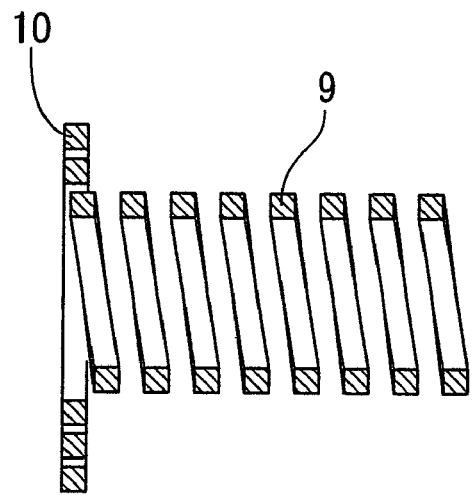
FIG. 6 is a vertical sectional front view of yet another coil spring according to the present invention.
Figure 7:
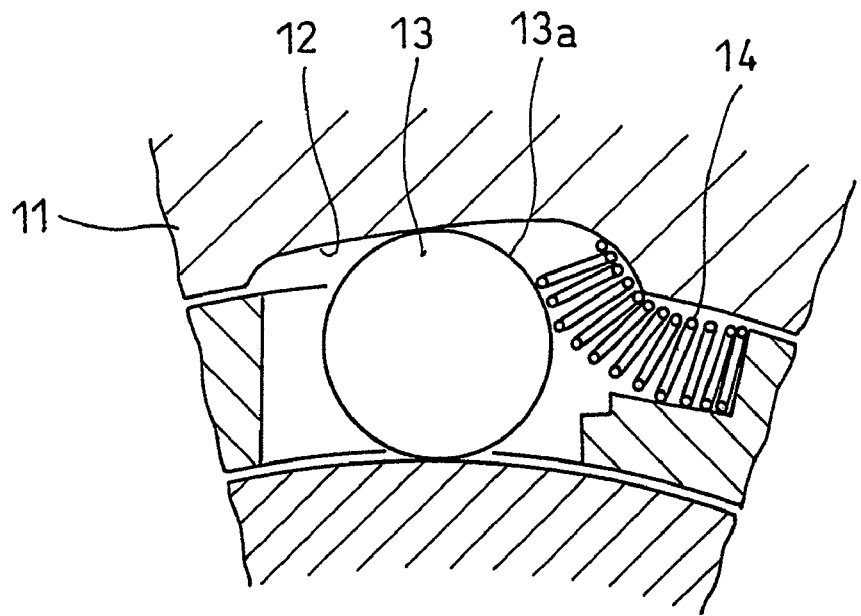
FIG. 7 is a sectional view of a portion of a conventional one-way clutch.

The wire forming each coil springs 9 of the embodiment has a circular cross-section. But instead, the coil springs 9 according to the invention may comprise wires having a rectangular cross-section as shown in FIG. 6.

What is claimed is:

1. A one-way roller clutch comprising:
an outer ring;
an inner ring mounted inside said outer ring and having an outer cylindrical surface, said outer ring having an inner periphery with a plurality of cam surfaces thereon, each of said cam surfaces defining a wedge-shaped space in cooperation with the outer cylindrical surface of said inner ring;
rollers each mounted between said outer cylindrical surface and one of said cam surfaces, and each of said rollers having a diameter; and
coil springs each biasing one of said rollers toward a narrow portion of a corresponding one of said wedge-shaped spaces;
wherein each of said coil springs has a first end facing the roller and a second end remote from the roller;
wherein each of said coil springs has, at said first end thereof, a radially outwardly extending spiral roller abutment portion;
wherein each of said coil springs has a main portion extending from said second end thereof to said radially outwardly extending spiral roller abutment portion;
wherein, for each of said coil springs, said radially outwardly extending spiral roller abutment portion has an outer diameter larger than a largest outer diameter of said main portion;
wherein, for each of said coil springs, the outer diameter of the radially outwardly extending spiral roller abutment portion is configured with respect to a respective one of the wedge shaped spaces between the inner ring and the outer ring and the diameter of a respective one of the rollers such that there is insufficient radial space for the first end of the coil spring to separate from the respective roller by slipping along a surface of the respective roller.

2. The one-way roller clutch of claim 1 wherein said roller abutment portion of each of said coil springs comprises a flat spiral.

3. The one-way roller clutch of claim 1 wherein said roller abutment portion of each of said coil springs comprises a conical spiral.

4. The one-way roller clutch of claim 1 wherein said coil springs have a circular cross-section.

5. The one-way roller clutch of claim 1 wherein said coil springs have a rectangular cross-section.

6. The one-way roller clutch of claim 1 wherein said coil springs are each formed of a wire having a circular cross-section.

7. The one-way roller clutch of claim 1 wherein said coil springs are each formed of a wire having a rectangular cross-section.

8. The one-way roller clutch of claim 1 further comprising a retainer mounted between said inner and outer rings and fixed to said outer ring, said retainer having pockets each receiving one of said rollers and spring-receiving recesses each communicating with one of said pockets and receiving said second end of one of said coil springs.

9. The one-way roller clutch of claim 1 wherein the rollers are cylindrical rollers each having a cylindrical surface with which the first end of a respective one of the coil springs is in abutment.

10. The one-way roller clutch of claim 1 wherein, for each of said coil springs, said radially outwardly extending spiral roller abutment portion is constituted by at least one turn of the coil spring and engages directly against a respective one of said rollers.

11. The one-way roller clutch of claim 10 wherein said roller abutment portion of each of said coil springs comprises a flat spiral.

12. The one-way roller clutch of claim 10 wherein said roller abutment portion of each of said coil springs comprises a conical spiral.

13. The one-way roller clutch of claim 10 wherein said coil springs have a circular cross-section.

14. The one-way roller clutch of claim 10 wherein said coil springs have a rectangular cross-section.

15. The one-way roller clutch of claim 10 wherein said coil springs are each formed of a wire having a circular cross-section.

16. The one-way roller clutch of claim 10 wherein said coil springs are each formed of a wire having a rectangular cross-section.

17. The one-way roller clutch of claim 10 further comprising a retainer mounted between said inner and outer rings and fixed to said outer ring, said retainer having pockets each receiving one of said rollers and spring-receiving recesses each communicating with one of said pockets and receiving said second end of one of said coil springs.

\* \* \* \* \*